United States Patent [19]

McIntyre

[11] Patent Number: 4,913,771

[45] Date of Patent: Apr. 3, 1990

[54] METHOD FOR DEWATERING SLUDGE OR SLURRY

[76] Inventor: Glover C. McIntyre, 743 Aspen Road, Pickering, Ontario, Canada, L1V 3P4

[21] Appl. No.: 276,343

[22] Filed: Nov. 25, 1988

[51] Int. Cl.$^4$ .............................................. B01D 3/10
[52] U.S. Cl. .................................... 159/47.1; 159/2.2; 159/43.1; 159/47.3; 159/DIG. 16; 159/DIG. 42; 34/15; 34/92; 34/242; 137/895; 202/205; 202/269; 203/2; 203/11; 203/DIG. 14
[58] Field of Search ............... 159/2.2, 16.1, DIG. 16, 159/DIG. 42, 43.1, 44, 22, 47.1, 47.3; 202/234, 205, 201, 269; 137/895; 203/49, 11, 1, 2, 91, DIG. 14; 34/15, 92, 242

[56] References Cited

U.S. PATENT DOCUMENTS

| | | | |
|---|---|---|---|
| 144,358 | 11/1873 | Root | 203/DIG. 14 |
| 3,214,352 | 10/1965 | Wells | 159/DIG. 16 |
| 3,799,234 | 3/1974 | Skidmore | 159/2.2 |
| 3,826,718 | 7/1974 | Takayasu | 159/44 |
| 3,859,052 | 1/1975 | Walther | 159/44 |
| 3,997,406 | 12/1976 | Arvanitakis | 159/2.2 |
| 4,141,799 | 2/1979 | Thelen et al. | 159/2.2 |
| 4,198,265 | 4/1980 | Johnson | 159/2.2 |
| 4,296,072 | 10/1981 | Takacs et al. | 159/DIG. 16 |

*Primary Examiner*—Wilbur Bascomb

[57] ABSTRACT

Sludge or slurry is dewatered by passing it on a screw conveyor through a sealed vessel at a vacuum more negative than −10 inches of Hg.

As a result, moisture is removed from the sludge or slurry as water vapor. The vessel is sealed from air by the presence of the sludge or slurry at the inlet and outlet port extents of the vessel.

8 Claims, 2 Drawing Sheets

METHOD FOR DEWATERING SLUDGE OR SLURRY

This invention relates to means and a method for reducing the moisture content or 'de-watering' of sludge or slurry. Such sludge or slurry may be industrial, sewage or of any other type wherein a mixture of solids and water in sludge or slurry form is to be treated to reduce its water content.

There are many methods of de-watering sludges or slurries operating by such means as: filter arrangements, filter presses, heating the sludge or slurry or chemical treatment. However, all of such methods have disadvantages including expense and inefficient operation.

By negative pressure herein I mean pressures lower then atmospheric.

It is an object of my invention to provide a means and method for de-watering sludges or slurries which provide for conveying such sludges or slurries through an environment having a negative pressure of greater than $-10''$ Hg., resulting in the conversion of water in such sludges or slurries into vapor, and the removal of such vapor. The degree of negative pressure and the time the sludge or slurry is in the environment will control the amount of water removal and the exit water content of the sludge or slurry. However, it is noted that negative pressures of $-29''$ Hg. will be often a median of the usual operating range.

It is found that the invention as broadly defined in the previous clause is cheaper and more efficient than prior methods.

It is an object of a preferred facet of the invention to create the negative pressure environment in a sealed vessel having ports for conveying slurries or sludges into and out of the vessel for exposure therein to the negative pressure and means for removal from the vessel of the water vapor extracted from the sludge or slurry.

It is an object of a preferred facet of the invention described in the previous paragraph wherein the negative pressure is created by the suction inlet of a venturi and preferably a steam venturi and it will be noted that with such arrangement the extracted water vapor is automatically carried away in the venturi out-flow for condensation or disposition.

In drawings which illustrate a preferred embodiment of the invention

Figure 1:
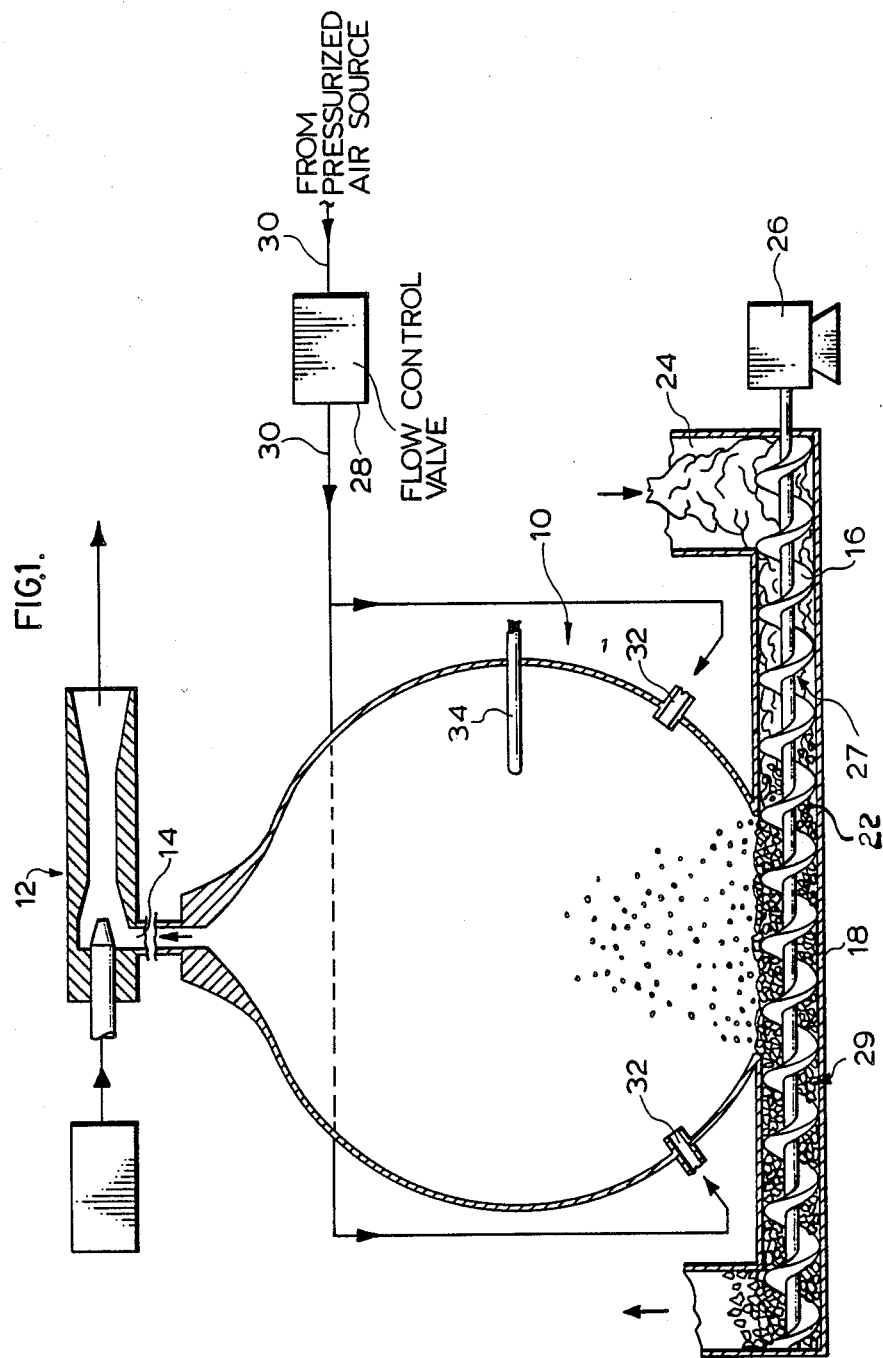
FIG. 1 is a vertical section, partly schematic, of the invention.
Figure 2:
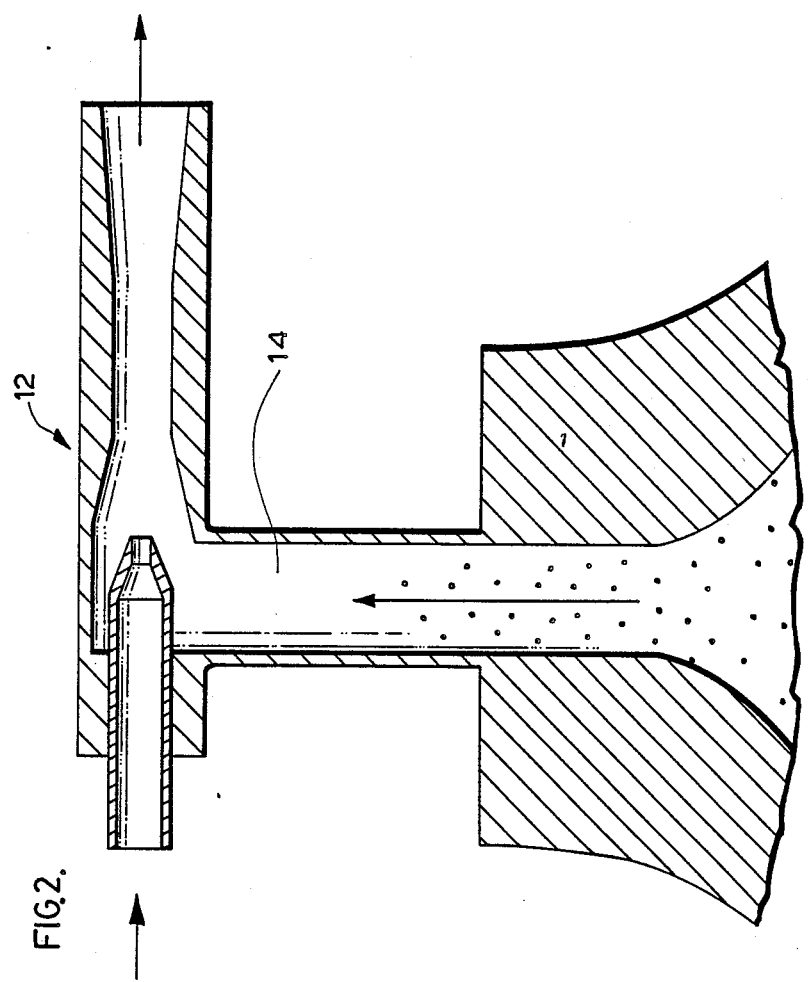
FIG. 2 is a view, to a larger scale of the venturi for producing suction.

In the drawings a sealed vessel 10, designed to withstand the negative pressures involved, has an upper outlet to suction inlet 14 of the steam venturi 12. Such steam venturis are well known to those skilled in the art for use in other application and are available as 'Fox Venturi Ejectors' from Mecorsys Inc., 96 Martin Ross Ave., Downsview, Ontario, Canada M3J 2L4.

A screw conveyor 16 driven by motor 26 with enclosing trough 18 is located to carry sludge into the vessel through port 22. The trough 18 is open to the inside of the vessel to expose the sludge to the vessel atmosphere and closed outside it. A chute 24 is connected to the input end of the conveyor to provide sludge thereto. The sludge is broken and tumbled by the screw conveyor to be exposed to the negative pressures in the vessel. Modifications to the screw conveyor to ensure tumbling in the vessel are well known to those skilled in the art. Means for removing the de-watered sludge from the output end of the conveyor will be provided, by conventional means.

It will be noted that the screw conveying method used automatically seals the vessel at the sludge entrance and exit ports extents 27 and 29 so that no substantial quantity of air leaks in at the sludge ports. If a different method of conveying sludge into and out of the vessel is used, then care must be taken to seal against leakage at the inlet and outlet sludge ports. It follows that slurries used with the invention must have a sufficiently solid constituency to effect substantial air sealing of port extents 27 and 29.

Air is supplied from a supply, not shown, through valve 28 and along line 30 to inlet ports 32 into the gaseous portion of the vessel environment. It is preferred to control the pressure by creating a high negative pressure through operation of the venturi and modifying it to the amount desired by air flow through valve 28 and ports 32. It is optional to control the pressure solely through control of the venturi without using ports 32.

Operating pressures in the vessel may be sensed by any conventional manner and pressure sensor 34 indicated is schematic only. Valve 28 may be connected for automatic control responsive to the pressure sensed by sensor 34.

If a different means than the venturi is provided for producing negative pressure then means for removal of the extracted water vapor (which occurs automatically with the venturi) must be provided.

In operation, of the specific embodiment, the degree of negative pressure in the vessel will be controlled by that created by the venturi as modified by the air inlet through ports 32. The degree of moisture extraction will be controlled by the negative pressure in the vessel together with the time passage of the sludge while open to the vessel environment.

In operation sludge passing along conveyor 16 is broken and tumbled by the conveyor 16 and exposed to the negative pressure in the vessel created by the venturi and modified by the air inlet. The sludge dewatered to the extent planned exits from the conveyor to a disposal or use point. The water exiting in the venturi stream may be recovered for industrial use or disposed of by well known means, not shown.

I claim:

1. Method of removing moisture from sludge or slurry comprising:
    transporting said sludge or slurry through the lower portion of a sealed vessel on a screw conveyor,
    passing said sludge or slurry into and out of said vessel through respective inlet and outlet port extents
    exposing said sludge or slurry on said conveyor to the environment in said sealed vessel
    during said exposure creating a vacuum more negative than $-10''$ Hg. in said environment,
    removing from said environment water vapor resulting from said moisture from said sludge or slurry
    transporting said sludge or slurry on said conveyor so as to effect substantial air sealing at said inlet and outlet port extents,
    wherein the sludge or slurry entering and leaving the inlet and outlet port extents, respectively, has a sufficiently solid constituency to effect such substantial air sealing.

2. Method as claimed in claim 1 with the added step of providing controlled air ingress to said environment and controlling said air to maintain the desired level of said vacuum.

3. Method as claimed in claim 1 wherein said vacuum is controlled to create negative pressures of about −29″ Hg.

4. Method as claimed in claim 2 wherein said vacuum is controlled to create negative pressures of about −29″ Hg.

5. Method as claimed in claim 1 wherein a venturi is used to create said vacuum and also to remove said water vapor.

6. Method as claimed in claim 2 wherein a venturi is used to create said vacuum and also to remove said water vapor.

7. Method as claimed in claim 3 wherein a venturi is used to create said vacuum and also to remove said water vapor.

8. Method as claimed in claim 4 wherein a venturi is used to create said vacuum and also to remove said water vapor.

* * * * *